United States Patent Office 3,374,056
Patented Mar. 19, 1968

3,374,056
PROCESS FOR INCREASING THE THERMAL STABILITY OF SYNTHETIC FAUJASITE
Philip K. Maher, Baltimore, and Carl V. McDaniel, Laurel, Md., assignors to W. R. Grace & Co., New York, N.Y., a corporation of Connecticut
No Drawing. Filed Dec. 3, 1964, Ser. No. 415,781
3 Claims. (Cl. 23—112)

ABSTRACT OF THE DISCLOSURE

A process for increasing the thermal stability of crystalline zeolites, which is characterized by immersing the zeolite in an aqueous electrolytic solution, continuing the immersion until ion exchange equilibrium is obtained between the zeolite and solution and then steeping the zeolite in said solution at a temperature of from 80 to 120° C. for at least an additional 2 hours.

---

This invention relates to a process for increasing the thermal stability of crystalline zeolites.

In summary, the process of this invention is a method for increasing the thermal stability of unstable crystalline zeolites comprising the steps of contacting the crystalline zeolite with a liquid selected from the group consisting of water and aqueous solutions of electrolytes at temperatures within the range of from 80 to 120° C. for at least 2 hours after the crystalline zeolite is in ion exchange equilibrium with the liquid, and recovering the stabilized product.

The formation of ultra-stable crystalline zeolites has been previously disclosed. The ultra-stable zeolites are important as promoters in petroleum cracking catalysts. A previously disclosed process for making these ultra-stable zeolites comprises a sequence of ion exchange steps to replace alkali metal ions in the zeolite interposed with a step of heating the zeolite to temperatures within the range of 1300 to 1600° F. The intermediate heating step permits subsequent alkali metal removal by direct ion exchange techniques to previously unobtained levels, and provides intermediate materials from which the ultra-stable zeolite can be formed. However, as the alkali metal content in the zeolite is lowered, the zeolite tends to be thermally unstable, and the crystal structure of the zeolite tends to be destroyed by the intermediate heating temperatures which are within the range of from 1300 to 1600° F.

It is an object of this invention to provide a process whereby crystalline zeolites which tend to be thermally unstable due to low alkali metal contents can be stabilized so that their crystalline structure is not destroyed by heating at temperatures within the range of from 1300 to 1600° F.

Crystalline zeolites which can be treated by the process of this invention include the synthetic zeolites listed in Table A.

TABLE A

| Zeolite | Oxide Mole Ratios (shown as alkali metal oxide form) | Patent Disclosure |
|---|---|---|
| Zeolite X | $1.0\pm0.2Na_2O:Al_2O_3:2.5\pm0.5SiO_2:0-8H_2O$ | U.S. 2,882,244. |
| Zeolite Y | $0.9\pm0.2Na_2O:Al_2O_3:3-6SiO_2:0-9H_2O$ | U.S. 3,130,007. |
| Zeolite A | $1.0\pm0.2Na_2O:Al_2O_3:1.85\pm0.5SiO_2:0-6H_2O$ | U.S. 2,882,243. |
| Zeolite L | $1.0\pm0.1Na_2O:Al_2O_3:6.4\pm0.5SiO_2:0-7H_2O$ | Bel. 575,117. |
| Zeolite D | $0.9\pm0.2[(0-1)Na_2O:(1-0)K_2O]:Al_2O_3:4.5-4.9SiO_2:0-7H_2O$ | Can. 611,981. |
| Zeolite R | $0.9\pm0.2Na_2O:Al_2O_3:2.45-3.65SiO_2:0-7H_2O$ | U.S. 3,030,181. |
| Zeolite S | $0.9\pm0.2Na_2O:Al_2O_3:4.6-5.9SiO_2:0-7H_2O$ | U.S. 3,054,657. |
| Zeolite T | $1.1\pm0.4[(0.1-0.8)Na_2O:(0.9-0.2)K_2O]:Al_2O_3:6.9\pm0.5SiO_2:0-8H_2O$ | U.S. 2,950,952. |
| Zeolite Z | $K_2O:Al_2O_3:2SiO_2:0-3H_2O$ | Can. 614,995. |
| Zeolite E | $0.9\pm0.1Na_2O:Al_2O_3:1.95\pm0.1SiO_2:0-4H_2O$ | Can. 636,931. |
| Zeolite F | $0.95\pm0.15Na_2O:Al_2O_3:2.05\pm0.3SiO_2:0-3H_2O$ | U.S. 2,996,358. |
| Zeolite O | $0.95\pm0.05Na_2O:Al_2O_3:12.2\pm0.05SiO_2:0-5H_2O$ | U.S. 3,140,252. |
| Zeolite B | $1.0\pm0.2Na_2O:Al_2O_3:3.5\pm1.5SiO_2:0-6H_2O$ | U.S. 3,008,803. |
| Zeolite Q | $0.95\pm0.05Na_2O:Al_2O_3:2.2\pm0.05SiO_2:XH_2O$ | U.S. 2,991,151. |
| Zeolite M | $1.0\pm0.1K_2O:Al_2O_3:2.0\pm0.1SiO_2:XH_2O$ | U.S. 2,995,423. |
| Zeolite H | $1.0\pm0.1Na_2O:Al_2O_3:2.0\pm0.1SiO_2:XH_2O$ | U.S. 3,010,789. |
| Zeolite J | $0.9\pm0.1K_2O:Al_2O_3:2.1\pm0.2SiO_2:XH_2O$ | U.S. 3,011,869. |
| Zeolite W | $1.0\pm0.1Na_2O:Al_2O_3:4.1\pm0.8SiO_2:YH_2O$ | U.S. 3,012,853. |
| Zeolite KG | $0.9-1.1Na_2O:Al_2O_3:2.3-4.2SiO_2:2.6-4.6H_2O$ | U.S. 3,056,654. |

Among the naturally occurring crystalline aluminosilicates which can be employed in the process of this invention are included levynite, dachiardite, erionite, faujasite, analcite, paulingite, noselite, ferriorite, heulandite, scolecite, stibite, clinoptilolite, harmotome, phillipsite, brewsterite, flakite, datolite, and alumino-silicates represented as follows:

Chabazite, $Na_2O.Al_2O_3.4SiO_2.6H_2O$
Gmelinite, $Na_2O.Al_2O_3.4SiO_2.6H_2O$
Cancrinite, $3(Na_2O.Al_2O_3.2SiO_2).Na_2CO_3$
Leucite, $K_2O.Al_2O_3.4SiO_2$
Lazurite, $(Na,Ca)_8Al_6Si_6O_24.2(S,Cl,SO_4)$
Scaplite, $Na_4Al_3Si_9O_{24}.Cl$
Mesolite, $Na_2O.Al_2O_3.3SiO_2.2-3H_2O$
Ptilolite, $Na_2O.Al_2O_3.10SiO_2.4H_2O$
Mordenite, $Na_2O.Al_2O_3.10SiO_2.6.6H_2O$
Nepheline, $Na_2O.Al_2O_3.2SiO_2$
Natrolite, $Na_2O.Al_2O_3.3SiO_2.2H_2O$
Sodalite, $3(Na_2O.Al_2O_3.2SiO_2).2NaCl$ The preferred crystalline zeolites which can be employed in the process of this invention are the "synthetic faujasites." "Synthetic faujasites" are defined as including Zeolite X and Zeolite Y, examples of which are disclosed in U.S. Patent Nos. 2,882,244 and 3,130,007, respectively, since both of these compositions exhibit the crystal structure of natural faujasite.

"Unstable crystalline zeolites" and "unstable synthetic faujasite" are defined as the corresponding zeolites which have an alkali metal content which is so low that the crystal structure of the zeolite tends to exhibit thermal instability and be destroyed when heated at temperatures between 1300 and 1600° F. The alkali metal content which causes the tendency to thermal instability varies from zeolite to zeolite and between batches of the same zeolite. Generally synthetic faujasite having alkali metal contents expressed in terms of the oxide of less than about 3 weight percent tend to be unstable.

The liquid media with which the zeolites are contacted in the process of this invention are water or aqueous solution containing electrolytes. The electrolytes which may be present in an aqueous media do not produce the stabilization obtained in the process of this invention. However, stabilization by the process of this invention can be obtained in aqueous electrolyte solutions. The liquid media can contain any of the electrolytes which do not destroy the zeolite structure, for example, electrolytes having as cations, hydrogen ions, ammonium ions, amines, and metal ions from Groups I through VIII of the Periodic Table. The electrolyte can be of a type having cations which are either exchangeable with the cations in the zeolites or which will not undergo substantial ion exchange with the zeolite.

In the process of this invention, the unstable crystalline zeolites are contacted with the liquid media at a temperature within the range of from 80 to 120° C., preferably from about 90 to 110° C., for at least 2 hours after the crystalline zeolite is in ion exchange equilibrium with the liquid medium. "Ion exchange equilibrium" is defined as the state of equilibrium which exists between a zeolite and an aqueous medium after ion exchange therebetween is substantially complete, i.e., after about 98 percent of the ions which would ultimately be exchanged by a particular liquid medium have been exchanged. Obviously, the state of ion exchange equilibrium exists almost instantly when the liquid media is deionized water. Because the process of this invention is highly effective for preparing exchanged zeolites for subsequent heating at temperatures between 1300 and 1600° F. in the process for making ultra-stable zeolites, it is convenient to carry out the process of this invention in an exchange solution after the ion exchange is substantially complete. The critical effect obtained in the process of this invention occurs after heating for at least 2 hours after ion exchange equilibrium is obtained. Prolonged heating does not impair the zeolite stability obtained by the process of this invention, but heating for a period of time greater than 24 hours does not provide significant added benefits to be normally expedient. Preferably, the zeolite is contacted with the liquid for at least 3 hours after the zeolite is in ion exchange equilibrium with the liquid.

Other aspects of the process of this invention are illustrated by the following specific, but non-limiting examples. The surface areas of the crystalline zeolites in these examples are measured by the well known Brunauer-Emmett-Teller method [S. Brunauer, P. Emmett, and E. Teller, J. Am. Chem. Soc., 60, 309 (1938)].

*Example 1*

The crystalline zeolite which was treated by the process of this invention was prepared as follows. A 30 pound sample (dry basis) of synthetic faujasite (Z–14HS zeolite, otherwise known as Zeolite Y) was base exchanged for one hour at 100° C. in a solution containing 45 pounds of ammonium sulfate in 225 pounds of water. The product was then separated from the exchange solution by filtration. The exchange was repeated 2 more times in fresh solutions of 45 pounds of ammonium sulfate in 225 pounds of water. The product was then washed and heated to 1000° F. for 4 hours. At this point, the zeolite had the following composition expressed in terms of mole ratios of oxides:

$$(0.15Na_2O:0.85H_2O):Al_2O_3:5.1SiO_2$$

20 pounds of the heat-treated material was then treated 3 times at 100° C. in fresh solutions of 60 pounds of ammonium sulfate in 300 pounds of water. The last exchange treatment was followed by prolonged heating in the exchange solution at 100° C., the total time of contact between the zeolite and the solution being about 5 hours. The zeolite was then separated from the solution by filtration, washed and dried.

The thermal stability of the zeolite was measured on two samples. One portion of the zeolite (Sample A) was heated for 6 hours at 1500° F. Another portion of the zeolite (Sample B) was heated for 4 hours at 1500° F. and then 2 hours at 1725° F. The surface areas of each of these samples were measured, and the measurements obtained are shown in Table B.

TABLE B

| Sample: | Surface area, m.$^2$/g. |
|---|---|
| A | 783 |
| B | 690 |

*Example 2*

This example illustrates the criticality of the time of contact between the zeolites and the liquid media after ion exchange equilibrium is obtained. The crystalline zeolite which was treated in this example was synthetic faujasite which had been dried for 2 hours at 1000° F. and had the following approximate formula, expressed in terms of mole ratios of oxides:

$$(0.15Na_2O:0.85H_2O):Al_2O_3:5.0SiO_2$$

A 40 gram sample of this material was treated with a solution containing 120 grams of ammonium sulfate in 660 grams of water at 100° C. A portion (Sample C) was removed after one hour in the exchange solution, and the remaining portion (Sample D) was treated for 3 hours. The products were separated from the solutions by filtration, and were washed and dried. Each sample was subjected to two thermal stability tests, Test 1 comprising heating a portion of each sample at 1500° F. for 6 hours, and Test 2 comprising heating another portion of each sample at 1500° F. for 4 hours and then at 1725° F. for 2 hours. The surface areas of the products were measured and are shown in Table C.

TABLE C

| Sample | Surface Area, m.$^2$/g. after test | |
|---|---|---|
| | Test Treatment Test 1 | Temperature, °F. Test 2 |
| C | 73 | 12 |
| D | 672 | 538 |

As can be seen, the one hour treatment of the zeolite with the liquid medium did not effect thermal stability of the product since the crystalline structure of the zeolite was substantially destroyed by the heating treatment. In contrast, Sample B exhibited unusual thermal stability following the severe test treatments.

*Example 3*

This example illustrates the utility of the method of this invention for effecting thermostability of Type X zeolites. The zeolite employed in this example has the following chemical formula, expressed in terms of mole ratios of oxides, after being dehydrated:

$$1.0Na_2O:Al_2O_3:3.0SiO_2$$

A 75 grams sample of the zeolite was treated with a solution containing 6.45 grams of ammonium sulfate and 129 grams of water for 3 hours at 100° C., was separated from the solution and washed, and was heated to 1300° F. for 2.5 hours. This procedure was repeated 4 times with fresh solutions. The product contained 1.41 wt. percent sodium expressed as the oxide. Three samples of the product were heated for 2 hours at elevated temperatures, one sample at 1550° F., a second sample at 1650° F. and the third sample at 1725° F. The surface area of each of the samples after heating was measured and is shown in Table D.

TABLE D

| Test temperature, °F.: | Surface area, m.²/g. |
|---|---|
| 1550 | 626 |
| 1650 | 622 |
| 1725 | 226 |

Obviously, many modifications and variations of the invention as herein above set forth may be made without departing from the essence and scope thereof, and only such limitations should be applied as are indicated in the claims.

We claim:

1. A process of increasing the thermal stability of an unstable synthetic crystalline faujasite having an alkali metal content, expressed as the oxide, of less than about 3 percent by weight, which comprises:
   (a) contacting the faujasite with an aqueous electrolytic solution containing ammonium ions by immersing said faujasite in a bath of said solution,
   (b) continuing the immersion until ion exchange equilibrium between faujasite and solution, with respect to the ammonium ion, is reached,
   (c) steeping the faujasite in the solution by continuing the immersion at a solution temperature of from 80 to 120° C. for at least 2 hours after said equilibrium is reached, whereby the thermal stability of the faujasite is increased,
   (d) and recovering the faujasite from the solution.

2. The process of claim 1 wherein the temperature of the solution in step (c) is within the range of from about 90 to 110° C.

3. A process of claim 1 wherein the immersion of the faujasite within the solution is maintained for at least 3 hours after the faujasite is in ion exchange equilibrium with the solution.

References Cited

UNITED STATES PATENTS

| 3,130,006 | 4/1964 | Rabo et al. | 23—111 X |
| 3,140,251 | 7/1964 | Plank et al. | 252—455 X |
| 3,250,728 | 5/1966 | Miale et al. | 252—455 |
| 3,293,192 | 12/1966 | Maher et al. | 252—455 X |

EDWARD J. MEROS, *Primary Examiner.*